No. 12,310. REISSUED JAN. 31, 1905.

O. U. MIRACLE & W. L. DOW.

BUILDING WALL AND CONCRETE BLOCK FOR SAME.

APPLICATION FILED NOV. 7, 1904.

Witnesses:
H. S. Gaither
Fred G. Fischer

Inventors
Orville U. Miracle
by Wallace L. Dow.
Burton & Burton Attorneys.

No. 12,310. Reissued January 31, 1905.

UNITED STATES PATENT OFFICE.

ORVILLE U. MIRACLE, OF MINNEAPOLIS, MINNESOTA, AND WALLACE L. DOW, OF SIOUX FALLS, SOUTH DAKOTA, ASSIGNORS, BY DIRECT AND MESNE ASSIGNMENTS, TO THE MIRACLE PRESSED STONE COMPANY, A CORPORATION OF SOUTH DAKOTA.

BUILDING-WALL AND CONCRETE BLOCK FOR SAME.

SPECIFICATION forming part of Reissued Letters Patent No. 12,310, dated January 31, 1905.

Original No. 730,780, dated June 9, 1903. Application for reissue filed November 7, 1904. Serial No. 231,806.

*To all whom it may concern:*

Be it known that we, ORVILLE U. MIRACLE, residing at Minneapolis, county of Hennepin, and State of Minnesota, and WALLACE L. DOW, residing at Sioux Falls, county of Minnehaha, and State of South Dakota, citizens of the United States, have invented new and useful Improvements in Building-Walls and Concrete Blocks for the Same, of which the following is a specification, reference being made to the accompanying drawings, forming a part thereof.

The purpose of this invention is to provide an improved building-block of the general character of brick, tile, or stone concrete which shall afford more complete protection against frost and have structural advantages not afforded by the concrete building-blocks heretofore made.

It consists of the features of construction which are specified in the claims.

Figure 2:
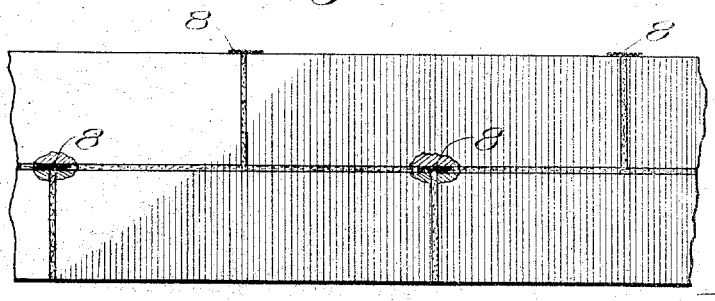
Figure 4:
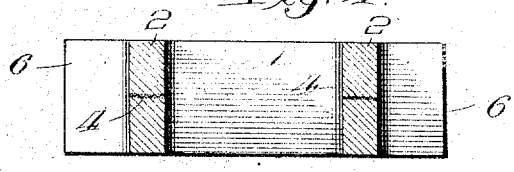
Figure 3:
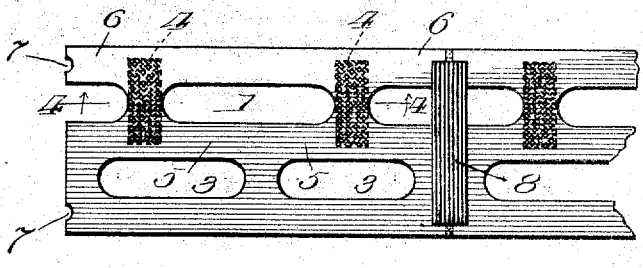
Figure 1:
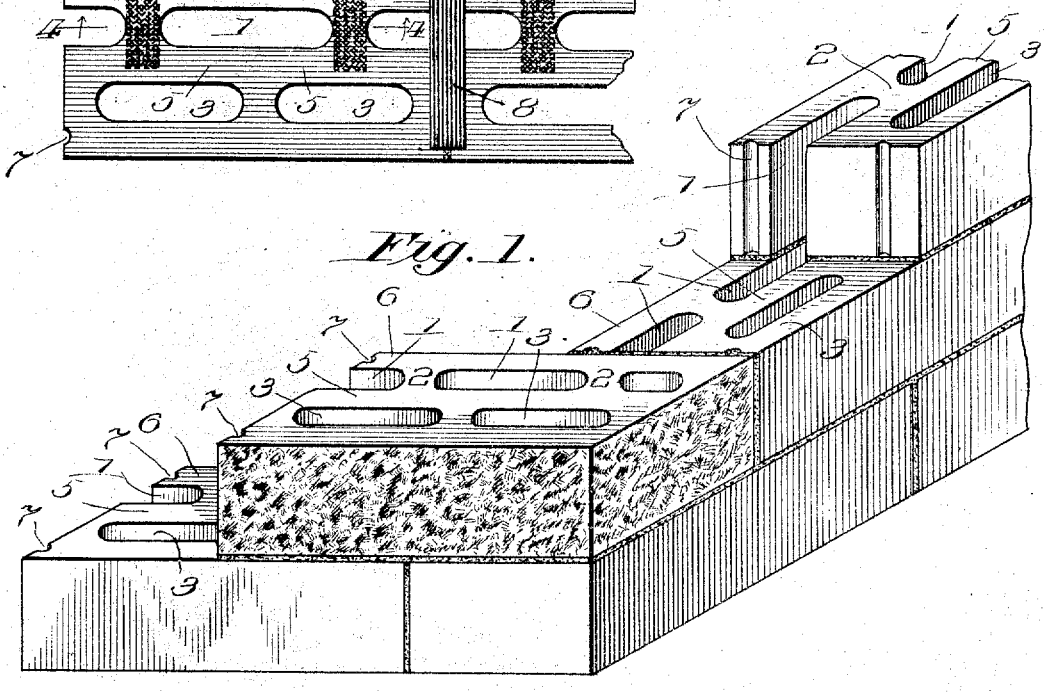

In the accompanying drawings, which form a part of this application, Figure 1 is a perspective of a portion of a wall constructed of our improved concrete building-blocks. Fig. 2 is a detail elevation or face view of a portion of such wall. Fig. 3 is a plan view of a piece of wall such as shown in Fig. 2. Fig. 4 is a detail section at the line 4 4 on Fig. 3.

In the construction of our improved building-wall we employ the concrete building-blocks which are represented in the drawings and which will be first described in respect to their detail structure as individual or independent blocks.

Each block is formed with two longitudinal rows of apertures, oblong in horizontal section, extending vertically through the block, the apertures 1 1, &c., of one row located opposite the intervals or necks 2 2 of the other row. Preferably, also, but not necessarily for all purposes of the invention, one of the rows has at each end an aperture opening out through the end of the block, the blocks being designed to be assembled in the wall with these open-end apertures registering to form a completely-encompassed aperture. In order to strengthen the neck 2 between these open-end apertures and the next aperture in the block, there are embedded in the concrete at these necks strips 4 of strengthening fabric, as woven wire-cloth. These strips preferably do not extend to the face of the block, but may without objection extend to the opposite aperture 3. The staggering arrangement of the air-spaces 1 and 3 of the two rows has the purpose and effect of preventing the existence of a continous neck of concrete extending directly from the buter to the inner surface of the block. Such continuous neck is objectionable, because it affords, speaking in the common phrase, a short path for the frost from the outer to the inner surface. The staggering arrangement shown not only makes a long path comprising two of the necks 2 2, each of which ends at one end in one of the air-cavities, but in addition a length 5 of the web or diaphragm bounded on both sides by the air-spaces 1 and 3. The exposure of the web 5, as well as that of the ends of the neck 2 at the cavities 1 and 3, tends very greatly to prevent the formation of frost on the inner surface at the end of the neck 2 which terminates at that surface, because of the large area at which the material may gather heat from the adjacent air in the spaces 1 and 3 or, conceiving of cold as a positive instead of a negative, because of the large area for radiation in the said air-spaces. Preferably the blocks are assembled in the wall with the row of apertures 1 1, which includes the open-end apertures, at the ends of the blocks at the inner side. The advantage of this construction is that thereby the outer side, which is presumably more likely to be exposed to blows or shocks, is the stronger, having none of the open-end apertures which necessitate the short terminal tongues 6, which are more liable to be broken off than the full side wall or bridge extending the whole length of an aperture is to be broken in two, and for the same reason, preferably, as stated, both open-end apertures, which necessarily result from the staggered construction, are formed in one of the rows instead of one in each row, because by this means all the open-end apertures, and thereby all the terminal tongues 6, may be at one side and are by the mode of assembling above indicated at the inner and less exposed side.

By the construction above described it will be observed that a given amount of concrete formed into a building-block of a given width or cross-sectional area will yield a block of such character that when assembled one above another in the construction of a wall it is less liable to collapse, because the comparatively thin walls of the cavities are more frequently braced by the cross-webs; but, furthermore, an especial advantage from the structure shown is that damage resulting from breaking through the shell into any aperture is very much less than would result from similar breaking if there were but a single row, because whereas in the former case after one such break there is still a full aperture with walls on both sides unbroken intervening between the outer air and the space inclosed by the wall, in the latter case—that is, where the apertures are in a single row—a crack or break leading into any one aperture destroys the whole value of the air-space as a means of preventing the conduction of heat or the formation of frost, and there is left but a single thin wall between the inside and outside air. In view of these advantages of the form of block herein shown it is designed to construct them of suitable depth or thickness, so that they may be assembled in a single layer to form a wall, the wall being thus of the thickness of the individual blocks only. When thus assembled—that is, without another layer lapping the joints of the first, as would be the case in ordinary erection of brick structures—it is desirable to provide against lateral displacement, which is guarded against by the lapping structure, and for this purpose there are formed in the ends of the blocks vertical grooves 7 7, in which the mortar hardening operates as a key, preventing to the extent of its resistance to shearing the lateral displacement of the blocks.

Preferably the adjacent blocks in each tier are secured together, in addition to the vertical securement effected by the mortar, by means of longitudinally-corrugated metal binders 8 8, which are lodged in the mortar lapping the abutting ends of the two blocks at each joint, as seen in Fig. 2. The mortar hardening in the corrugations of these binders operates, as in the vertical grooves 7, to the extent of its resistance to shearing as a key, preventing the longitudinal separation of the blocks, so far as that might occur, by the parting of the mortar, it being presumed that the mortar will make a conjunction with the block stronger or less liable to be parted than the mortar itself is to be broken, so that the corrugated metal binder embedded in the mortar as described tends to make the entire joint as strong as the junction between the mortar and the concrete block.

It should be understood that the cavities or apertures referred to in the foregoing specification and the following claims as "vertical" are necessarily for their purpose of intercepting the direct frost-paths from outer to inner (vertical) surfaces of the block interposed between such inner and outer (vertical) surfaces and must be distinguished by this fact from like cavities which might be interposed between the horizontal (upper and lower) surfaces of the block, and the term "vertical" is applied in the specification and the claims to these cavities to express this distinction.

Having thus described our invention, what we claim as new, and desire to secure by Letters Patent, is—

1. A building-wall consisting of concrete blocks having vertical air-cavities and intervening necks disposed in a plurality of longitudinal rows, each neck having opposite it a cavity of another row longer than such neck, whereby the cavities of either row lap by the ends of the consecutive cavities of another row, such cavities extending through the blocks from top to bottom, and the blocks being assembled in the wall with their cavities one above the other in vertical succession to form continuous vertical cavities in the wall.

2. A building-wall consisting of concrete blocks having two rows of vertical air-cavities, the cavities of one row being located opposite and longer than the intervals or necks between the consecutive cavities of the other row, whereby they lap by said consecutive cavities, one of the rows having at each end of the block a half-cavity constituting a notch or recess in said end, the blocks being assembled in longitudinal order, with such half-cavities registered and forming together a continuous cavity across the junction plane.

3. A building-wall consisting of concrete blocks having two rows of air-cavities, the cavities of one row being located opposite and being longer than the intervals or necks between the consecutive cavities of the other row, whereby they lap by the ends of such consecutive cavities respectively, one row of cavities comprising an open-end cavity constituting a notch or recess at each end of the block, the blocks being assembled in the wall with the row having such open-end cavities at the inner side of the wall, and with such open-end cavities matched or registered to form fully-encompassed cavities.

4. In a building-wall, concrete blocks having two rows of cavities, the cavities of one row being opposite the intervals between those of the other row; said blocks having strengthening fabric embedded in the concrete extending across the necks or intervals between consecutive cavities to strengthen said neck.

5. In a building-wall, a concrete building-block having rows of air-cavities separated by intervening necks or webs of the concrete, abutting ends of the blocks having open-end cavities which register to form complete cavities when the blocks are assembled in the wall, said blocks having strengthening fabric embedded in the concrete at the necks or intervals between such open-end cavities and the next cavity thereto.

6. In a building-wall a concrete block having two longitudinal rows of air-cavities, such air-cavities extending vertically through the blocks, the cavities of each row being located opposite the intervals between those of the adjacent row, one of the rows having at both ends an open-end cavity; the block being formed with a strengthening fabric, such as woven wire, embedded in the concrete at the neck between said open-end cavity and the next cavity in the same row.

7. A concrete building-block having vertical air-cavities and intervening necks disposed in a plurality of longitudinal rows, each neck of any row being opposite a cavity longer than said neck in another row, whereby the cavities of either row lap by the ends of the consecutive cavities of another row.

8. A concrete building-block having a plurality of longitudinal rows of vertical air-cavities, such cavities being longer than the intervals or necks between them and than the intervals between the end of the block and the cavity nearest the end of each row, each such neck being opposite such longer cavity of another row, such cavity by the excess of length lapping by the end of each cavity next to the neck in the row containing such neck.

9. A concrete building-block having a plurality of longitudinal rows of vertical air-cavities and intervening necks, each neck in any row being opposite a longer cavity of another row.

10. A concrete building-block having vertical cavities with intervening necks disposed in a plurality of longitudinal rows, each neck having opposite it in another row a cavity longer than such neck, each end of the block having one of the cavities opening through it and forming a notch or recess in such end.

11. A building-wall consisting of concrete blocks, each of which has vertical cavities and intervening necks disposed in a plurality of longitudinal rows, such blocks being assembled in the wall with their corresponding rows of cavities and intervening necks forming continuous rows of such cavities and necks in the wall, each neck having opposite to it in another row a cavity longer than such neck.

In testimony whereof we have hereunto set our hands, in the presence of two witnesses, at Sioux Falls, South Dakota, September 29, 1904.

ORVILLE U. MIRACLE.
WALLACE L. DOW.

Witnesses:
F. C. WHITEHOUSE,
H. M. AVERY.